(12) United States Patent
Karlsson

(10) Patent No.: US 10,607,090 B2
(45) Date of Patent: Mar. 31, 2020

(54) TRAIN SECURITY SYSTEM

(71) Applicant: ICOMERA AB, Göteborg (SE)

(72) Inventor: Mats Karlsson, Göteborg (SE)

(73) Assignee: ICOMERA AB, Gothenburg (SE)

( * ) Notice: Subject to any disclaimer, the term of this patent is extended or adjusted under 35 U.S.C. 154(b) by 0 days.

(21) Appl. No.: 15/367,883

(22) Filed: Dec. 2, 2016

(65) Prior Publication Data

US 2017/0161568 A1 Jun. 8, 2017

(30) Foreign Application Priority Data

Dec. 2, 2015 (SE) ...................................... 1551575

(51) Int. Cl.
*G06K 9/00* (2006.01)
*B61L 27/00* (2006.01)
(Continued)

(52) U.S. Cl.
CPC .......... *G06K 9/00791* (2013.01); *B61L 23/00* (2013.01); *B61L 23/041* (2013.01); *B61L 23/047* (2013.01); *B61L 25/025* (2013.01); *B61L 25/04* (2013.01); *B61L 27/0094* (2013.01); *G06K 9/64* (2013.01); *B61L 2205/04* (2013.01)

(58) Field of Classification Search
CPC ...... G06K 9/00791; G06K 9/64; B61L 25/04; B61L 25/025; B61L 23/00; B61L 27/0094
See application file for complete search history.

(56) References Cited

U.S. PATENT DOCUMENTS 7,526,102 B2 * 4/2009 Ozer .................. G06K 9/00228
382/103
7,999,848 B2 * 8/2011 Chew .................... B61L 23/041
348/143
(Continued)

FOREIGN PATENT DOCUMENTS

| EP | 1 175 757 A1 | 1/2002 |
| WO | WO 00/67435 A1 | 11/2000 |
| WO | 2006/074298 A2 | 7/2006 |

OTHER PUBLICATIONS

Extended European Search Report dated Apr. 13, 2017, issued by the European Patent Office in corresponding European Application No. EP 16201688.5 (8 pages).
(Continued)

*Primary Examiner* — Bobbak Safaipour
(74) *Attorney, Agent, or Firm* — Buchanan Ingersoll & Rooney P.C.

(57) ABSTRACT

A method for identifying an alteration of an object in the vicinity of a train in operation travelling on a rail track along a route. The train is operative to transport passengers or cargo. The method includes capturing image data of an object located at a point of interest along said route when said train is operational on said rail track. Furthermore, said image data is analyzed to find matching reference image data stored in a data storage device. Based on said matching reference image data, said object is located at a position within said point of interest. Further, said image data is analyzed to find an alteration of said object compared to said matching reference image data. If an alteration is found, an action depending may be taken.

7 Claims, 3 Drawing Sheets

(51) Int. Cl.
*B61L 25/02* (2006.01)
*B61L 23/00* (2006.01)
*G06K 9/64* (2006.01)
*B61L 25/04* (2006.01)
*B61L 23/04* (2006.01)

(56) References Cited

U.S. PATENT DOCUMENTS

| | | | |
|---|---|---|---|
| 9,875,414 B2* | 1/2018 | Naithani | G06K 9/00798 |
| 2007/0040070 A1* | 2/2007 | Stevenson | B61L 29/30 |
| | | | 246/122 R |
| 2007/0217670 A1 | 9/2007 | Bar-Am | |
| 2012/0269383 A1* | 10/2012 | Bobbitt | B61L 17/00 |
| | | | 382/103 |
| 2014/0072169 A1 | 3/2014 | Haas et al. | |
| 2015/0009331 A1 | 1/2015 | Venkatraman | |
| 2015/0235094 A1 | 8/2015 | Kraeling et al. | |
| 2015/0268172 A1 | 9/2015 | Naithani et al. | |
| 2017/0222903 A1* | 8/2017 | Karlsson | H04W 72/0446 |
| 2017/0223592 A1* | 8/2017 | Karlsson | H04W 36/08 |
| 2017/0317939 A1* | 11/2017 | Karlsson | H04L 47/24 |
| 2018/0339720 A1* | 11/2018 | Singh | B61K 9/08 |
| 2019/0039633 A1* | 2/2019 | Li | B61L 23/044 |
| 2019/0042871 A1* | 2/2019 | Pogorelik | G06T 5/00 |
| 2019/0259281 A1* | 8/2019 | Martin | G06T 7/70 |

OTHER PUBLICATIONS

Swedish Office Action dated May 31, 2016, by the Swedish Patent Office in corresponding Patent Application No. 1551575-2 (10 pages).

* cited by examiner

TRAIN SECURITY SYSTEM

TECHNICAL FIELD

The present invention relates to a method and a system for identifying an alteration of an object in the vicinity of a passenger or cargo train in operation travelling on a rail track along a route.

BACKGROUND OF THE INVENTION

There is today an increasing demand on transportation services. Delays are in general not accepted and the requirements on safety are high. Vehicles for transporting passengers or cargo, in particular trains, travel over large distances and in many cases in remote areas. This has several impacts on both safety and on-time arrival demands. For example, maintenance of the rail tracks and surrounding structures is increasingly important since e.g. a fallen post has an impact on safety and may also cause substantial delays.

Further, since in particular trains often travel in remote areas, they visit location which otherwise may not be easily accessible to people. Thus, in case of a malfunction of the train due to structural damages on the rail tracks, or on structures in the vicinity of the rail tracks, it may take some time for personnel to reach the place of the structural damage in order to repair the structures or the rails. It would therefore be desirable to monitor the structures and the rails to prevent such situations.

A prior art approach is to allow maintenance trains to travel the tracks in order to monitor in particular the rail tracks. Such a maintenance train travels the track a few times a year at most due to availability and cost. Furthermore, the prior art solutions discover damages that have already occurred, and these damages will often anyway compromise safety and cause delays, despite the possibility of detecting them.

Thus, a drawback of prior art solutions is that they are incapable of reliably identifying problems in at an early stage because they are unable to accurately identifying changes to structures near the rails, or changes to the rail itself.

Another drawback is that structural changes occurring over long time scales may not efficiently be taken into account.

There is therefore a need for a method for identifying already present or potential damages of this type in a simpler and more cost-effective way, thereby making it possible to use this more frequently, and there is also a need for a method being capable of identifying damages at an earlier stage.

SUMMARY OF THE INVENTION

In view of the above mentioned need, a general object of the present invention is to provide a method and a system for identifying an alteration of an object in the vicinity of a train in operation which at least to some extent alleviates the above-discussed drawbacks of the prior art, and at least partly fulfils the above-discussed needs.

According to a first aspect of the present invention, there is provided a method for identifying an alteration of an object in the vicinity of a train in operation when travelling on a rail track along a route, the train being operative to transport passengers and/or cargo, the method comprising:

capturing image data of an object located at a point of interest along the route when the train is operating on the rail track;

analyzing the image data to find matching reference image data stored in a data storage device;

based on the matching reference image data, locating the object at a position within the point of interest;

analyzing the image data to find an alteration of the object compared to the matching reference image data;

if an alteration is found, performing an action depending on the alteration.

In accordance with the invention, an "object" may be any object in the vicinity of the rail track which may be of interest to monitor. For example, there may be a mountain slope near the track which may alter due to environmental conditions, e.g. weather or landslides, or there may be posts, bars, booms, roads, trees, bridges, lamps, located near the rail tracks, or the rail track itself may be monitored. Thus, any object which may be of interest to monitor and which is visible from the train as it travels past the object, may be a subject for the invention.

Further, "image data" is in the context of the present application to be understood in a broad sense, indicating any two or three dimensional representation of a surface. Thus, the image data may be based on captured visible light, such as in conventional cameras. However, the image data may additionally or alternatively be based on other types of electromagnetic radiation, such as microwaves, infrared radiation, ultraviolet radiation, X-rays and the like. The image data may be captured by a sensor array, such as a CCD or the like, but may also be obtained by scanning in one direction using a linear array, or scanning in two dimensions. Further, the image data may be captured by receiving naturally occuring radiation, or by emitting light and capture the reflected light, e.g. by laser detection.

Further, the method analyzes the captured image data by e.g. image processing means which may execute an image recognition algorithm or similar for matching the captured image data with previously captured image data. If matching reference image data is found, it is possible to locate the object at a position within the point of interest.

In accordance with the invention, a point of interest is the location of the object and the surrounding area. Thus, the point of interest surrounds an area which includes the position of the object. For accurate matching of image data, the position of the object within the point of interest is found using appropriate means. However, the opposite is also possible, thus if a matching image is found, the point of interest may be determined from the matching image since it is may be known beforehand at what point of interest the reference image data was captured.

An "alteration" of the object may be any physical alteration, e.g. a change in appearance, or a structural change of the object. For example, the slope of a mountain side, a damaged bridge or post or boom, etc. The alteration may thus relate to alteration related to the safety for passengers of the train, or to alterations which may risk damaging the train, or alteration related to needed maintenance of the rail track. Alternatively or additionally, the alterations may relate to geological changes for studies of particular geological object of interest for other studies (e.g. scientific studies, road construction surveys etc.).

In accordance with the invention a "data storage device" may be used for storing e.g. software for controlling various functions related to the invention, may be any type of data storage device, including one of a removable nonvolatile/volatile random access memory, a hard disk drive, a floppy disk, a CD-ROM, a DVD-ROM, a USB memory, an SD memory card, or a similar computer readable data storage device known in the art.

Furthermore, in accordance with the invention, depending on the type or magnitude of the alteration that is found, different types of actions may be taken. In some particular cases, an alarm signal may be sent to the driver of the train giving an indication that there may be a hazard for other trains to operate on the route, in some cases the alteration is only logged for future analysis. Further, a signal may be sent for reporting the alteration by sending an alarm from the train to an off-train control center.

In some cases the method may further comprise the step of subsequently replacing the matching reference image data by the image data in the data storage device to form new matching reference image date. Thus, after a new set of image data has been captured and matched with the reference, the previous reference may be replaced by the new image data. This way, an updated reference is always kept in memory. Replacing the reference may be considered as taking an action.

The present invention provides a cost efficient solution for identifying alterations on objects located along the route of rail tracks for trains. By capturing image data of the object from a passenger or cargo train it is possible to more frequently study the objects compared to when using dedicated trains for collecting data.

The present invention is based on the realization that the accuracy of determining the status of objects near the rail tracks may be increased by using the already frequently travelling trains on the rail tracks. Furthermore, by using a matching algorithm is it possible to study the objects in more detail and also accurately locate the objects in an automated way. This lowers the manual work needed for identifying the alterations, and also the work which may be needed for identifying the correct object.

The method may advantageously store a plurality of image data such that a trend database is formed. Thus, a plurality of images may be stored in the data storage device and may thereafter be used for investigating e.g. if or when maintenance of the tracks or the surroundings of the tracks may be needed. For example, it may be decided after having studied the trend that trees need to be cut down, or that a mountain side needs to be fixed, or that a fence or a post is about to fall over and thus is in need of maintenance.

The point of interest may be located by a global positioning system. However, according to an embodiment, the captured image may have an associated location, wherein the point of interest is located by the associated location of the matching reference image data. In other words, by matching the captured image data with a reference image, it is possible to determine the point of interest from a previously stored location associated with the reference image. Thus, the image data may be tagged with location data e.g. in e.g. a data file header.

In one embodiment, the step of capturing image data of an object may be initiated when the train is within a predetermined distance from the point of interest. When it is determined, preferably by using GPS that the train is approaching the point of interest of an object, the method may initiate the capturing of image data. The capturing of image data may be done by capturing a stream of images of the object, such as by high-definition video. In this way, as the train approaches a point of interest, a stream of images is captured in order to ensure that the object is properly captured and to obtain a more accurate image of the object for matching with the reference image. Furthermore, this also enables a more accurate determination of the position of the object within the point of interest. Thus, locating the object may comprise determining, among the stream of images, the best matching image with the reference image data.

In accordance with the invention, the image data may be captured using a high speed camera, preferably a high speed high definition camera. The image data is preferably captured from a place on the train travelling on the rail track.

Further, the invention is useful in determining alterations of the rail track itself. Therefore, according to a second aspect of the present invention, there is provided a method for identifying an alteration of a rail track for a train during operation of the train travelling on a rail track comprising a first and a second rail, the train being operative to transport passengers and/or cargo, the method comprising:

capturing image data associated with a stream of images of at least one of the first rail and the second rail;

performing image data analysis of the image data to identify an alteration of the at least one of the first rail and the second rail compared to previously acquired image data of the rails.

The method may further comprise: acquiring image data from overlapping field of views of the first and the second rail, wherein the control unit is further configured to perform the image data analysis based on a combination of image data acquired from the overlapping field of views.

Effects and features of this second aspect of the present invention are largely analogous to those described above in connection with the first aspect of the invention and embodiments mentioned are largely compatible with embodiments mentioned in connection with the first aspect of the invention.

According to a third aspect of the present invention, there is provided a system for identifying an alteration of an object in the vicinity of a train in operation when travelling on a rail track along a route, the train being operative to transport passengers and/or cargo, the system comprising:

at least one image capturing device arranged on the train and configured to capture image data associated with a stream of images of an object located in the vicinity of the route when the train is operational on the rail track;

a control unit configured to receive image data from the image capturing device; and a data storage device, wherein the control unit is configured to:

match the image data with reference image data stored in the data storage device;

based on the matching reference image data, locating the object at a position at the point of interest;

analyze the image data to find an alteration of the object compared to the matching reference image data;

if an alteration is found, performing an action depending on the alteration.

According to an embodiment of the invention, the control unit may further be configured to replace the matching reference image data by the image data in the data storage device.

In accordance with the invention a "control unit" is preferably a micro processor or any other type of computing device.

The control unit may communicate with external devices located for example in a control centre. The communication may be achieved via any available data links such as two or more of e.g. GSM, Satellite, HSPA, EDGE, 1×RTT, EVDO, LTE, LTE-A, WiFi (802.11) and WiMAX; and combine them into one virtual network connection. In particular, it is preferred to use data links provided through wireless wide-area network (WWAN) communication technologies.

Effects and features of this third aspect of the present invention are largely analogous to those described above in connection with the first aspect and the second aspect of the invention and embodiments mentioned are largely compatible with embodiments mentioned in connection with the first aspect of the invention.

According to a fourth aspect of the present invention, there is provided a computer program product comprising a computer readable medium having stored thereon computer program means for executing the steps of the first or the second aspect of the invention.

Effects and features of this fourth aspect of the present invention are largely analogous to those described above in connection with the previous aspects of the invention and embodiments mentioned are largely compatible with embodiments mentioned in connection with the first and/or second aspect of the invention.

Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

For exemplifying purposes, the invention will be described in closer detail in the following with reference to embodiments thereof illustrated in the attached drawings, wherein.

DETAILED DESCRIPTION OF PREFERRED EMBODIMENTS

In the following detailed description, preferred embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention. In the following examples, an embodiment related to a train is disclosed. However, it is to be acknowledged by the skilled reader that the method and system are correspondingly useable on other moving vehicles, such as buses and the like.

Figure 1:
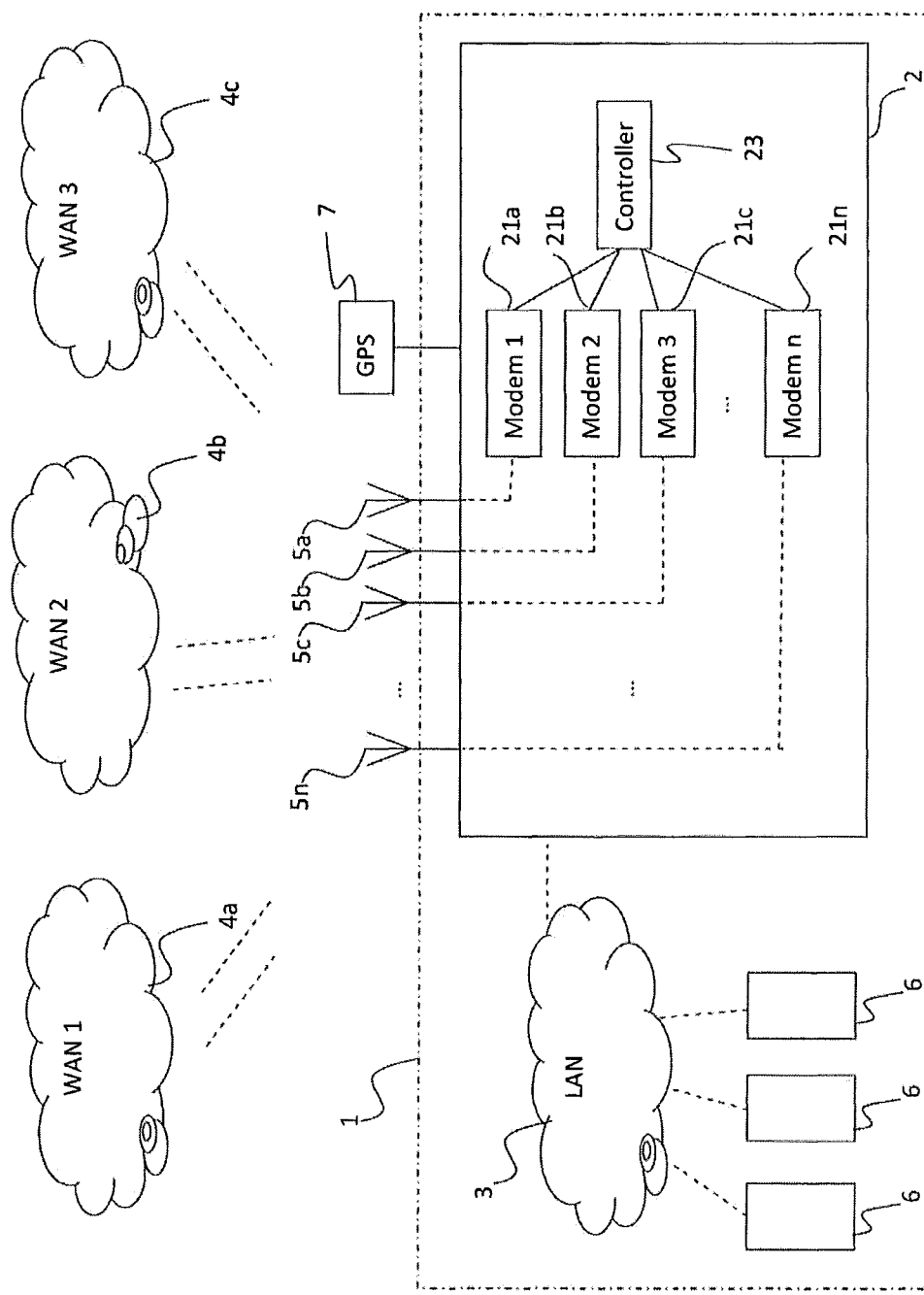
FIG. 1 is a schematic illustration of a train having a wireless communication system in accordance with an embodiment of the present invention.

In FIG. 1 a schematic illustration of a vehicle 1, such as a train, having a communication system is provided. The communication system comprises a data communication router 2 for receiving and transmitting data between an internal local area network (LAN) 3, and one or several external wide area networks (WANs) 4a, 4b, 4c. Communication to and from the WANs is provided through one or several external antennas 5 a-n on the vehicle roof. Two or more data links are available, either between the train and one of the WANs, and/or by using several WANs simultaneously.

The LAN is preferably a wireless network, using one or several internal antennas to communicate with terminal units 6 within the vehicle. It is also possible to use a wired network within the vehicle. The LAN may be set-up as wireless access point(s). The client(s) 6 may be computing devices such as laptops, mobiles telephones, PDAs and so on.

The data communication router preferably comprises a plurality of modems 21 a-n. Assignment of data streams to different WANs and/or to different data links on one WAN is controlled by a controller 23. The controller is preferably realized as a software controlled processor. However, the controller may alternatively be realized wholly or partly in hardware.

The system may also comprise a global positioning system (GPS) receiver 7 for receiving GPS signals indicative of the current position of the vehicle, and wherein the controller may be arranged to assign data streams to various data links also partly in dependence on the received GPS signals.

The data communication router may also be denominated MAR (Mobile Access Router) or MAAR (Mobile Access and Applications Router).

The data communication router is preferably arranged to communicate on at least two different communication routes having different characteristics. Hereby, the communication can be automatically optimized based on specific conditions, such as price, speed, etc. Such data communication routers are e.g. known from EP 1 175 757 by the same applicant, the document hereby incorporated by reference. Such routers are also commercially available from the applicant, Icomera AB. Hereby, the router may use all available data channels, such as two or more of e.g. GSM, Satellite, DVB-T, HSPA, EDGE, 1×RTT, EVDO, LTE, LTE-A, WiFi (802.11) Ethernet and WiMAX; and combine them into one virtual network connection. An automatic selection may be made among the available channels to use the most cost effective combination that fulfils the users' availability, bandwidth and reliability requirements. Hence, a seamless distribution of the data among the different channels can be obtained.

Figure 2:
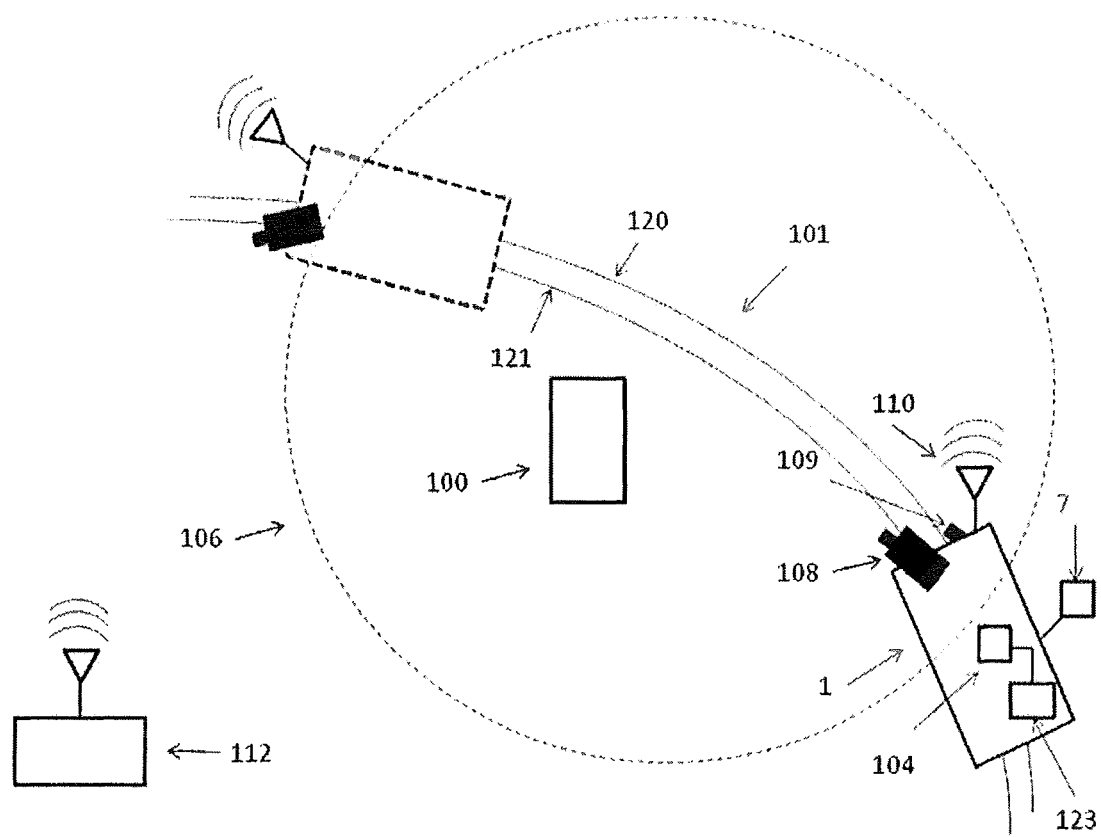
FIG. 2 is a schematic illustration of an embodiment of the invention.

An embodiment of a system for identifying an alteration of an object in the vicinity of a train is illustrated in FIG. 2. In FIG. 2, there is illustrated that the train 1 passes by an object 100. Furthermore, in FIG. 2, there is shown a train 1 travelling on a rail track 101 comprising the rails 120 and 121. The train 1 comprises the communication system described with reference to FIG. 1. As shown in FIG. 2, there is an image capturing device 108 and a global positioning system device 7 arranged on the train 1. The image capturing device 108 is preferably a high speed high definition camera. There is further an antenna 110 (may be any of the antennas 5a-n in FIG. 1) for communication with e.g. an external control center 112. In the external control center, there may be computers and personnel which may communicate with personnel on the train 1. The train 1 may for example be operative to transport passengers or cargo. There is further shown a point of interest 106 surrounding an object 100 located along the track 101. It may be determined by the GPS that the train 1 is within the point of interest 106. When the train approaches the point of interest 106, the camera 108 initiates (by e.g. receiving a start signal from the control unit 123) capturing of image data of the object 100, preferably a sequence of images in a stream. After the images have been captured, the control unit 123 analyses the image data by image processing algorithms known in the art (computer implemented image processing algorithms) and thereby tries to find a matching reference image data stored in a data storage device 104. Since a GPS has a limited spatial resolution, which may compromise the accuracy in identifying an alteration, the control unit 123 identifies the best match with the reference among the stream of images such that the location of the object 100 is accurately established. This improves the subsequent step of comparing the image data to the reference since the image data and the reference may thus be acquired from similar locations. Note that there is preferably only one reference image per point of interest. Each image has a tagged location data, thus, in case the GPS fails, the matching algorithm may be used to determine the location of the point of interest 106. When the best matching image of the object 100 has been found, the control unit 123 compares the captured image with the reference image and tries to find alterations of the object 100 in the newly captured image compared to the reference image. If an alteration is found, the control unit 123 may take different actions. For example, the alteration may be reported to an off-train control center 112, in particular, the alteration may be reported by sending an alarm if the alteration is severe and may cause a hazard. Alternatively or additionally, the control unit may store the image data e.g. in the data storage device 104 or in the control center 112 to form a trend database. Furthermore, the reference image data may be replaced by the newly captured image data, such that the reference image data is kept up to date.

Alternatively or additionally, the rails 120, 121 may be investigated for alterations in the rails 120, 121. This is performed by capturing image data associated with a stream of images of at least one of the first rail 120 and the second rail 121 and subsequently performing image data analysis of the image data to identify an alteration of the of at least one of the first rail 120 and the second rail 121 compared to previously acquired image data of the rails at the same location. The image data acquired for investigating the rails 120, 121 may be acquired by at least a second image capturing device 109 located under the train 1, close to the rails 120, 121. The second image capturing device 109 are arranged to capture image data of the rails 120, 121, and the control unit 123 analyzes e.g. the width between the rails 120, 121, the quality of the rails such as whether there are cracks or slope differences of the rails which are undesirable or unwanted rail-head defects.

Figure 3:
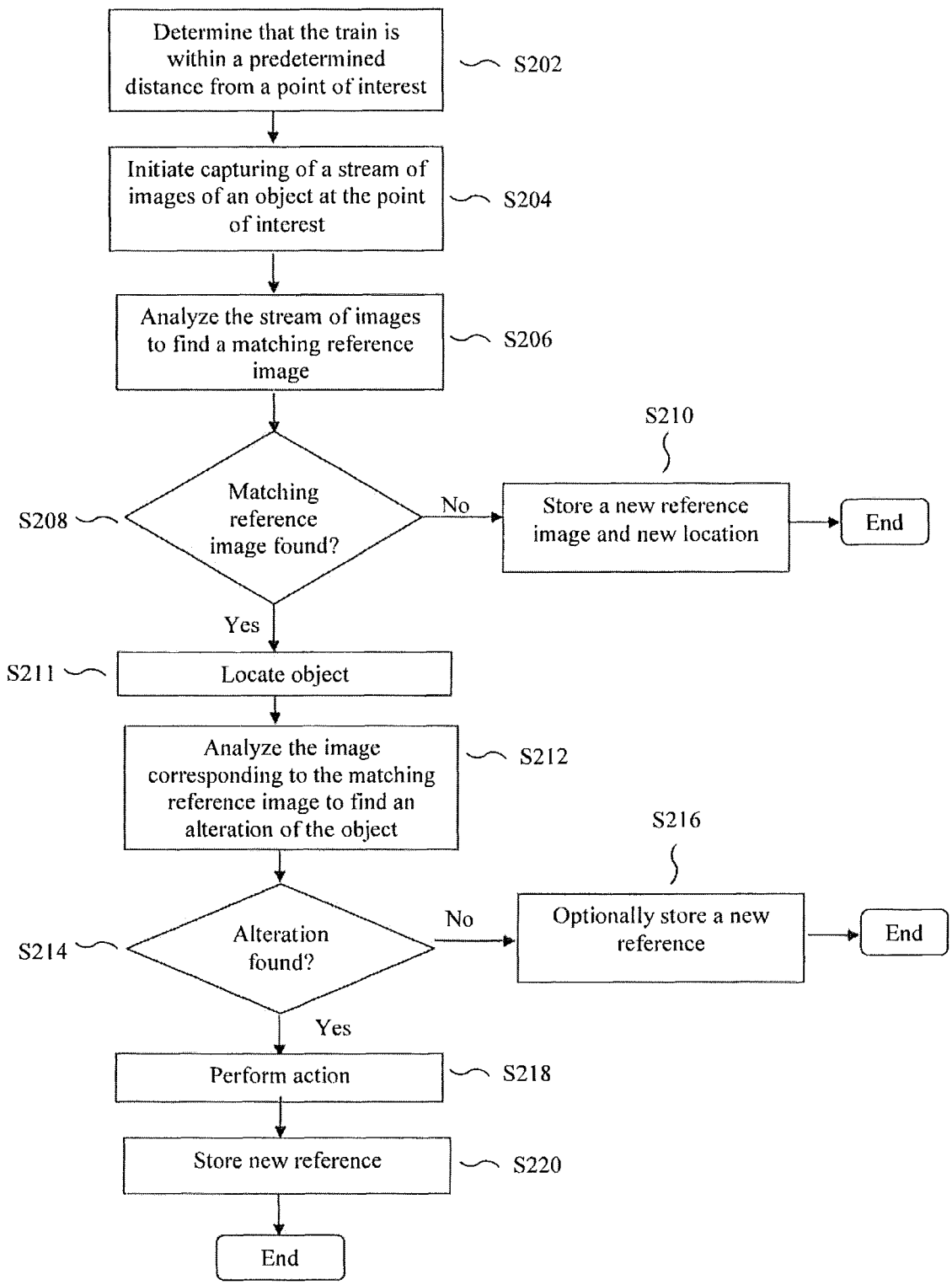
FIG. 3 is a schematic flow chart illustrating an embodiment of a method according to the present invention.

FIG. 3 provides a flow-chart of method steps according to an embodiment of the invention. In a first step S202, it is determined that the train carrying a system for identifying an alteration of an object in the vicinity of a train, is within a predetermined distance from a point of interest. The predetermined distance is preferable such that the point of interest is in the field of view for the camera. In a subsequent step S204, the camera captures image data as a stream of images of an object within the point of interest. The stream of images is analyzed in step S206 and compared S208 with a matching reference image among images stored in a database in the cloud (e.g. Internet), or in the control center 112 or locally in the data storage device 104 on the train 1. If a matching reference is not found it may mean that the object has not previously been analyzed, a new reference related to a new location may be stored S210 in the database. However, if a matching reference is found, the location of the object may be more accurately determined S211 by choosing the best match among the stream of images. Subsequently S212, the image among the stream of images which is the best match is analyzed using image processing and thus compared with the reference image in order to find any alterations of the object captured in the stream of images. If no alteration is found, a new reference may optionally be stored S216 and may replace the previous reference. Storing the image data enables forming a trend database of alterations of objects. If an alteration is found S218, an action may be taken by the system. For example, if the alteration is severe, the system may send an alarm signal to an off-train control center. If the alteration is less severe, the system may only store the image data for later analysis. Another action may be to notify the driver of the train of the alteration. As a subsequent optional step S220, a new reference is stored by replacing the previous reference with the image data that was determined to match the previous reference (step S208).

The invention has now been described with reference to specific embodiments. However, variations to the disclosed embodiments can be understood and effected by the skilled person in practicing the claimed invention, from a study of the drawings, the disclosure, and the appended claims. Such and other obvious modifications must be considered to be within the scope of the present invention, as it is defined by the appended claims. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements. Further, a single unit may perform the functions of several means recited in the claims.

The invention claimed is:

1. A method for identifying an alteration of an object in the vicinity of a train in operation when travelling on a rail track along a route, said train being operative to transport passengers and/or cargo, the method comprising:
   capturing a stream of images of an object located at a point of interest along said route by an imager when said train is operating on said rail track;
   analyzing said images by a controller to find matching reference image data stored in a data storage device;
   based on said matching reference image data, locating said object at a position within said point of interest;
   determining, among the stream of images, the image having the best match with the reference image data;
   analyzing said best matching image to find an alteration of said object compared to said matching reference image data;
   if no alteration is found, replacing said matching reference image data by said best matching image in said storage device to form new matching reference image data;
   if an alteration is found, performing an action depending on said alteration and subsequently replacing said matching reference image data by said best matching image in said data storage device to form new matching reference image data.

2. The method according to claim 1, further comprising, in the event that said alteration is found, reporting said alteration by sending an alarm from said train to an off-train control center.

3. The method according to claim 1, further comprising storing a plurality of image data of said object to form a trend database.

4. The method according to claim 1, wherein said point of interest is at least partly located by a global positioning system.

5. The method according to claim 1, wherein captured image data has an associated location, wherein said point of interest is located by the associated location of said matching reference image data.

6. The method according to claim 1, wherein said step of capturing image data of an object is initiated when said train is within a predetermined distance from said point of interest.

7. System for identifying an alteration of an object in the vicinity of a train in operation when travelling on a rail track along a route, said train being operative to transport passengers and/or cargo, said system comprising:

at least one imager arranged on the train and configured to capture image data associated with a stream of images of an object located in the vicinity of said route when said train is operational on said rail track;

a controller configured to receive image data from said imager; and a data storage device, wherein said controller is configured to:

match said image data with reference image data stored in said data storage device;

based on said matching reference image data, locating said object at a position at said point of interest;

determining, among the stream of images, the image having the best match with the reference image data;

analyze said best matching image to find an alteration of said object compared to said matching reference image data;

if no alteration is found, replacing said matching reference image data by said best matching image in said storage device to form new matching reference image data;

if an alteration is found, performing an action depending on said alteration and subsequently replacing said matching reference image data by said best matching image in said data storage device to form new matching reference image data.

\* \* \* \* \*